United States Patent [19]
Tomono et al.

[11] Patent Number: 5,478,637
[45] Date of Patent: Dec. 26, 1995

[54] PRINTING OFFSET BLANKET

[75] Inventors: Seiji Tomono, Nishinomiya; Toshikazu Ogita, Miki; Toshio Kamada; Tetsuya Fuchikami, both of Akashi, all of Japan

[73] Assignee: Sumitomo Rubber Industries, Ltd., Hyogo, Japan

[21] Appl. No.: 251,251

[22] Filed: May 31, 1994

[30] Foreign Application Priority Data

Jun. 7, 1993 [JP] Japan ................................ 5-136250

[51] Int. Cl.⁶ .............................. B32B 7/00; B41N 9/02
[52] U.S. Cl. .......................... 428/246; 428/247; 428/248; 428/304.4; 428/909
[58] Field of Search ........................ 428/909, 304.4, 428/246, 247, 248

[56] References Cited

U.S. PATENT DOCUMENTS

| | | | |
|---|---|---|---|
| 3,819,471 | 6/1974 | Sohnemann | 161/162 |
| 4,303,721 | 12/1981 | Rodriguez | 428/213 |
| 4,981,750 | 1/1991 | Murphy et al. | 428/220 |
| 5,069,958 | 12/1991 | Burns, Jr. | 428/246 |
| 5,294,481 | 11/1994 | Nakamura et al. | 428/245 |

Primary Examiner—P. C. Sluby
Attorney, Agent, or Firm—Nikadio, Marmelstein, Murray & Oram

[57] ABSTRACT

The offset blanket of the present invention has a structure comprising no reinforcing layer between its compressive layer and its surface printing layer. The surface printing layer has a thickness in the range of 5 to 20% based on the thickness of the whole blanket, and a hardness of the rubber which constitutes the surface printing layer which is in the range of 40° to 70° Type A, JIS K 6301. The compressive layer has a foam content (void volume) in the range of 30 to 60% and a thickness in the range of 10 to 30% based on the thickness of the whole blanket and a hardness of the rubber matrix constituting the compressive layer which is in the range of 40° to 80° Type A, JIS K 6301. Therefore, the offset blanket of the present invention is superior in paper feeding properties. Further, misregistry can be inhibited and solid inking properties are not deteriorated.

6 Claims, 6 Drawing Sheets

PRINTING OFFSET BLANKET

BACKGROUND OF THE INVENTION

The present invention relates to a printing offset blanket. More particularly, it relates to a printing offset blanket which is suitable for rotary offset printing used for news printing.

Figure 5:
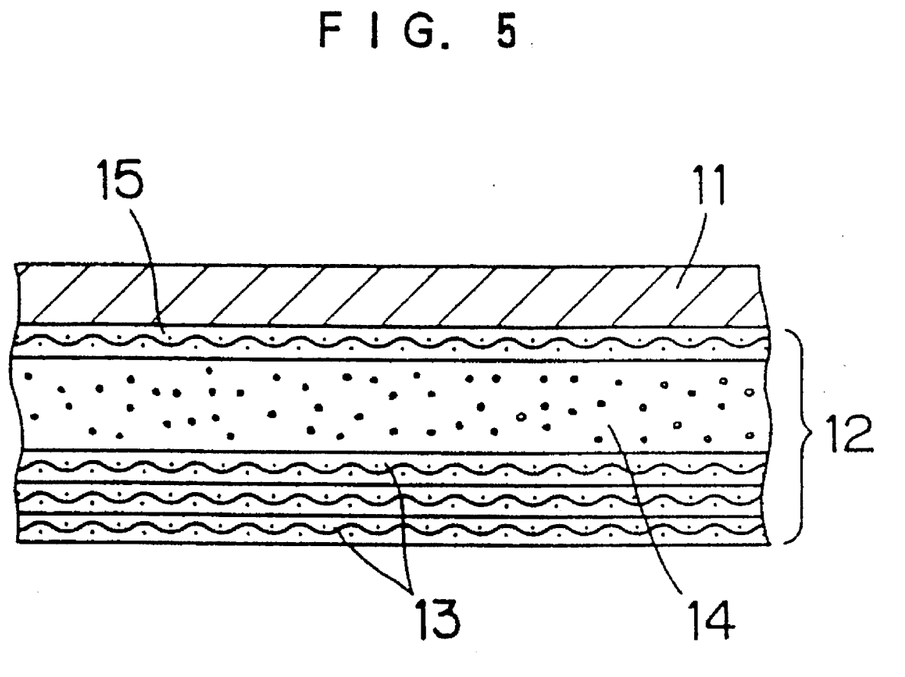
FIG. 5 is a schematic section illustrating a conventional offset blanket.

In general, an offset blanket used for rotary offset printing has a structure wherein a surface printing layer 11 is laminated on a supporting layer 12, as shown in FIG. 5. The supporting layer 12 is formed, for example, by laminating a plurality of supporting base layers 13 obtained by impregnating a supporting base with a rubber material (rubber cement) (normally, three or more cotton fabrics are laminated to each other), providing at least one compressive layer 14 on the supporting base layer and further laminating a reinforcing layer 15 on the surface of the compressive layer. The reinforcing layer 15 is that obtained by impregnating a woven fabric such as cotton, polyester, rayon, etc. with the same rubber material as that used in the above supporting base layer 13.

The reinforcing layer 15 plays a role in inhibiting the surface printing layer 11 from being shifted in a rotational direction at the time of printing to prevent misregister of printing, and the role in enhancing a pressure to be applied on the surface of the blanket at the time of printing to improve solid inking properties. Therefore, a conventional offset blanket is always provided with the reinforcing layer 15.

Figure 6:
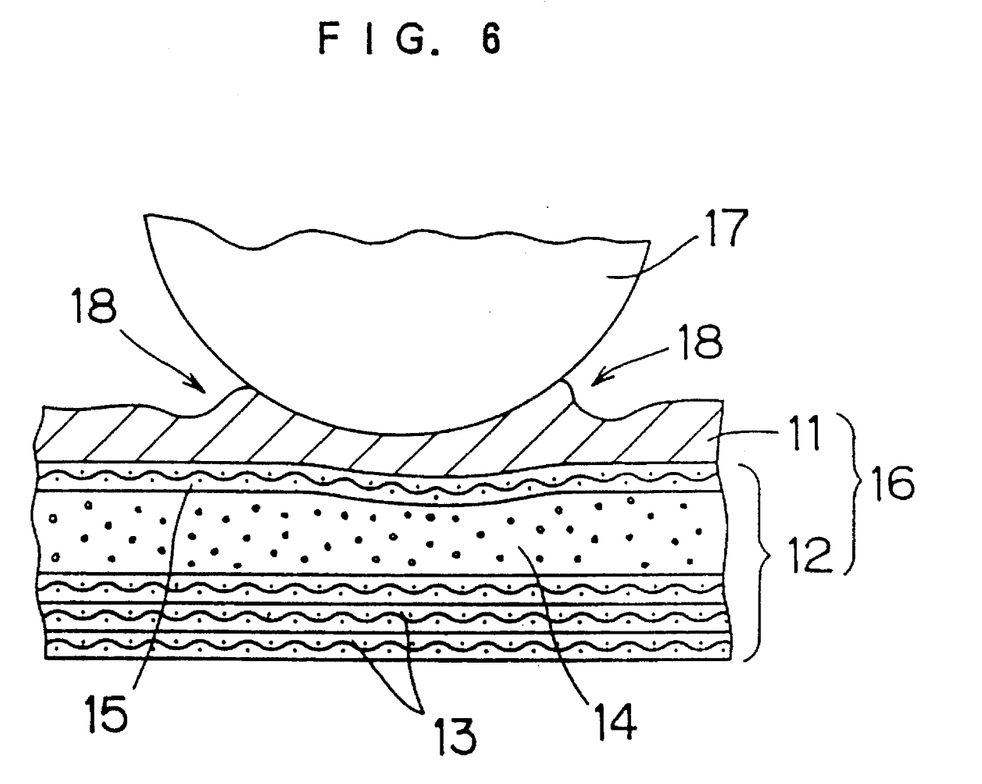
FIG. 6 is a schematic section illustrating a conventional offset blanket at the time of printing.

However, in offset printing using a conventional offset blanket as shown in FIG. 5, pressure absorption due to the compressive layer 14 is not sufficiently conducted when pressure is applied on the blanket 16 by an impression cylinder 17, as shown in FIG. 6, because the reinforcing layer 15 is disposed between the surface printing layer 11 and the compressive layer 14. Thereby, a so-called bulge 18 is formed in the blanket which is in contact with the impression cylinder 17.

When a bulge 18 is formed, the perimeter (length of the surface) of the blanket 16 is increased and the amount of paper fed per one rotation becomes larger, which results in a decrease in the paper's tension after it has passed through the blanket 16. As a result, the paper becomes slack between units in rotary offset printing.

Particularly, in rotary offset printing used for news printing, poor tension between B/B (Blanket to Blanket unit) and satellite (color printing unit) greatly influences the quality and workability of the printing. More concretely, paper slack due to an increase in the length of the perimeter of the blanket 16 causes printing defects, such as poor paper-feed, misregister, double images, etc.

On the other hand, the above problem can be solved by eliminating the reinforcing layer 15 from the offset blanket 16. However, it is impossible to inhibit the surface printing layer 11 from being shifted in a rotational direction by only eliminating the reinforcing layer 15. This shift results in formation of misregister and deterioration of solid inking properties.

SUMMARY OF THE INVENTION

It is a main object of the present invention is to provide a printing offset blanket wherein the formation of a bulge, causing poor printing, is inhibited.

It is another object to provide a printing offset blanket which causes no misregister problems and has good solid inking properties obtained by inhibiting the surface printing layer from being shifted in a rotational direction.

To achieve the above-mentioned objects, the present inventors have intensively studied the thickness and hardness of the surface printing layer as well as the hardness, foam content, and thickness of the compressive layer in the offset blanket. As a result, the present inventors have found a novel fact that, by using: a printing offset blanket having no reinforcing layer between its compressive layer and its surface printing layer: a surface printing layer having a thickness in the range of 5 to 20% based on the thickness of the whole blanket; a rubber which is used in the surface printing layer having a hardness in the range of 40° to 70°; a compressive layer having a foam content in the range of 30 to 60%, and a thickness in the range of 10 to 30% based on the thickness of the whole blanket, and hardness of a matrix rubber which comprises the compressive layer in the range of 40° to 80°; formation of a bulge can be inhibited and the surface printing layer can be inhibited from being shifted in a rotational direction. Further, misregistry can be inhibited and solid inking properties can be improved. Based on the above-mentioned finding, the present invention has been completed.

DETAILED DESCRIPTION OF THE INVENTION

Figure 1:
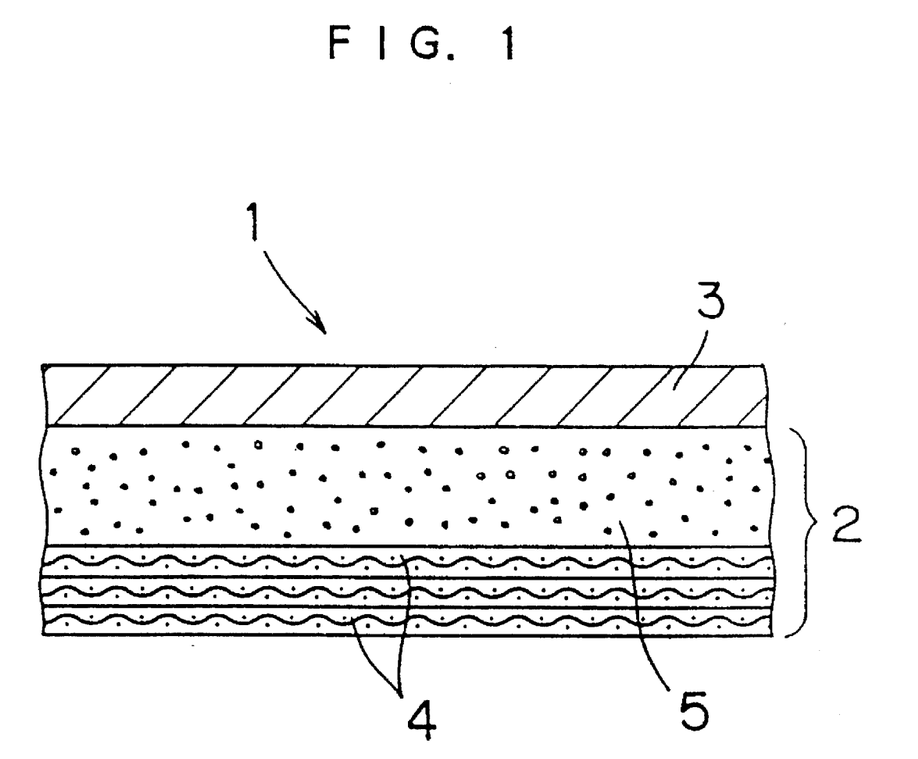
FIG. 1 is a schematic section illustrating one embodiment of an offset blanket of the present invention.

FIG. 1 is a schematic section illustrating one embodiment of an offset blanket of the present invention. As shown in FIG. 1, a supporting layer 2 is formed by providing a compressive layer 5 on the surface of a supporting base layer 4 made of a plurality of layers. A surface printing layer 3 is directly provided on the surface of the compressive layer 5.

Figure 2:
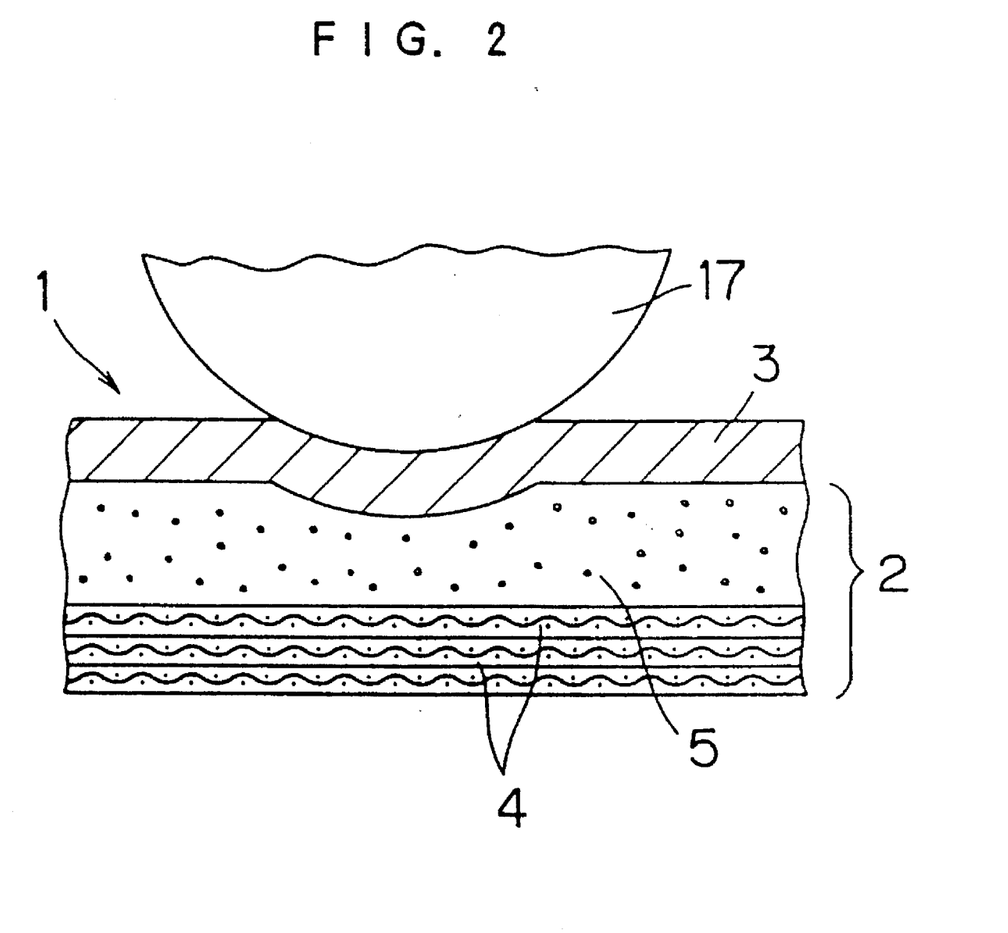
FIG. 2 is a schematic section illustrating an offset blanket of this invention at the time of printing.

When each property of the surface printing layer 3 and the compressive layer 5 in the present invention satisfies the above ranges, pressure applied on the blanket 1 by an impression cylinder 17 is satisfactorily transferred from the surface printing layer 3 to the compressive layer 5. Therefore, no bulge is formed and the surface printing layer is inhibited from being shifted in a rotational direction at the time of printing. Further solid inking properties of this blanket are excellent.

The thickness of the above described surface printing layer 3 is in the range of 5 to 20%, preferably 10 to 15%, based on the thickness of the whole blanket. When the thickness of the surface printing layer 3 is smaller than 5%, its solid inking properties are lowered. On the other hand, when the thickness exceeds 20%, paper feeding properties deteriorate because the undesired bulge is formed.

The hardness of the rubber of which the surface printing layer 3 is comprised is in the range of 40° to 70°, preferably 50° to 65°. The rubber hardness is a value measured using an A type hardness tester as defined in JIS K 6301. When the rubber hardness is less than 40°, the paper feeding properties are deteriorated because a bulge is formed. On the other hand, when the rubber hardness exceeds 70°, solid inking properties are extremely lowered.

The hardness of the rubber matrix constituting the compressive layer 5 is in the range of 40° to 80°, preferably 50° to 70°. The rubber hardness is a value measured using an A type hardness tester as defined in JIS K 6301, in the same manner as in the above description. When the rubber hardness is less than 40°, solid inking properties are deteriorated because resistance to applied compressive force is reduced. On the other hand, when the rubber hardness exceeds 70°, paper feeding properties become inferior because the ability of the compressive layer to absorb pressure is deteriorated.

The foam content (void volume or content) of the compressive layer 5 is in the range of 30 to 60%, preferably 35 to 55%. When the foam content is smaller than 30%, paper feeding properties becomes inferior because the ability of the compressive layer 5 to absorb pressure is deteriorated. On the other hand, when the void volume exceeds 60%, solid inking properties are deteriorated because too much compression is lowered.

The thickness of the compressive layer 5 is in the range of 10 to 30%, preferably 15 to 25%, based on the thickness of the whole blanket, including the thickness of the surface printing layer. When the thickness of the compressive layer 5 is smaller than 10%, paper feeding properties are deteriorated. On the other hand, when the thickness of this layer exceeds 30%, solid inking properties are deteriorated. Further, the whole thickness of the offset blanket 1 may normally be about 1.9 to 2.1 mm.

As the rubber material constituting the above described surface printing layer 3, for example, there can be used oil-resistant synthetic rubbers such as acrylonitrile-butadiene copolymer rubber, chloroprene rubber, polyurethane rubber, etc.; polysulfide rubbers; hydrogenated acrylonitrile-butadiene rubbers and the like. The surface printing layer 3 may be produced by mixing the above rubber material with a crosslinking agent (vulcanizer), forming the resulting mixture into the form of the surface printing layer and crosslinking the layer. Fillers may be added to the surface printing layer 3. Examples of the filler which can be used include inorganic fillers such as silica, calcium carbonate, hard clay, barium sulfate, talc, mica, asbestos, graphite, etc.; organic fillers, such as reclaimed rubber, powdered rubber, asphalts, styrene resin, glue, etc may be used.

The above described supporting base layer 4 in the supporting layer 2 is that obtained by laminating a plurality of supporting bases impregnated with the rubber material (rubber cement) (normally, 3 or more cotton fabrics are laminated each other).

As the supporting base, for example, there can be used a woven fabric of polyester, rayon and the like. Examples of the rubber material to be impregnated include acrylonitrile-butadiene copolymer rubber, chloroprene rubber and the like. If necessary, these rubber materials contain a predetermined amount of crosslinking agent, crosslinking accelerator, thickening agent and the like. The rubber material may be coated on the woven fabric using a suitable coating means such as blade coater.

As the matrix rubber constituting the above compressive layer 5, for example, there can be used oil-resistant synthetic rubbers such as acrylonitrile-butadiene copolymer rubber, chloroprene rubber, polyurethane rubber and the like. In order to obtain the compressive layer 5, a so-called leaching method is suitably employed. That is, a rubber cement wherein a water-soluble powder such as salt has been added was applied on a supporting base such as woven fabric, followed by drying and further crosslinking. Then, the crosslinked product was immersed in a hot water at 60° to 100° C. for 6 to 10 hours to elute the above water-soluble powder, followed by drying to form the compressive layer 5. The foam content of the compressive layer 5 varies depending on the amount of the water-soluble powder. Also, the compressive layer 5 in the present invention may be produced by a method other than leaching method, for example, foaming agent method.

The compressive layer 5 shown in FIG. 1 is a single layer, but the compressive layer of two or more layers may be formed through the supporting layer 4.

The above rubber material for forming the surface printing layer is applied on the surface of the resulting supporting layer 2 through a primer layer or not. After the rubber material was dried, the resulting laminate is vulcanized to obtain an offset blanket. As the primer layer, for example, there can be used acrylonitrile-butadiene copolymer, chloroprene rubber and the like.

The offset blanket thus obtained is applied for use after adhering directly or through a lining material on the circumferential surface of transfer cylinder.

As described above, the printing offset blanket of the present invention is superior in paper feeding properties in spite of eliminating of the reinforcing layer, because formation of bulge is inhibited. It is also possible to inhibit the surface printing layer from being shifted in a rotational direction and, therefore, misregister can be inhibited. Furthermore, since the pressure applied on the surface of the blanket at the time of printing can be maintained at a suitable value, solid inking properties are not deteriorated.

EXAMPLES

The following Examples and Comparative Examples further illustrate the present invention in detail but are not to be construed to limit the scope thereof.

A. Preparation of test offset blanket (1) Preparation of supporting layer

One cotton fabric for forming the compressive layer was laminated on a laminated sublayer of two cotton fabrics. The sublayer of cotton fabrics was obtained by applying a predetermined amount of an acrylonitrile-butadiene rubber cement containing a vulcanizing agent on the surface of a cotton fabric according to a blade coating method, followed by drying in a drying oven at 80° to 100° C. and further evaporation of the solvent.

On the other hand, the cotton fabric for forming the compressive layer was obtained by applying a predetermined amount of an acrylonitrile-butadiene rubber cement containing a predetermined amount of a salt on the surface of a cotton fabric according to a blade coating method, followed by drying in a drying oven at 80° to 100° C. and further evaporation of the solvent. The cotton fabric was vulcanized at a pressure of 2 kg/cm2 and a temperature of 150° C., and then immersed in a hot water at 70° C. for 24 hours to elute the salt.

(2) Preparation of surface printing layer

An acrylonitrile-butadiene rubber latex was applied on the surface of the non-vulcanized supporting layer obtained in the above item (1), and then dried to form a primer layer. Thereafter, an acrylonitrile-butadiene rubber latex for forming the surface printing layer was applied again on the surface of the primer layer so that a predetermined thickness can be obtained.

(3) Forming operation

The laminates obtained in the above items (1) and (2) were vulcanized at a pressure of 2 kg/cm2 and a temperature of 150° C. to obtain an offset blanket.

Regarding the resulting offset blankets (samples 1 to 19), the thickness (in % based on the total thickness) and hardness of the surface printing layer as well as the thickness (in % based on the total thickness), hardness and foam content of the compressive layer varies depending on the coating weight or amount of the salt, as shown in Table 1 below.

measuring B/B lower (feeding side) and B/B upper (satelite side) and calculating (B/B upper) minus (B/B lower). The higher the tension value is, the more formation of bulge is inhibited. It is considered that a proper tension value is normally 20 to 70 kg/cm2. Since the tension value of B/B lower was set to a constant value (30 kg/cm2) in this test, only the tension value of B/B upper was measured to evaluate paper feeding properties. The proper tension value of B/B upper in this case is a value obtained by adding the tension value of B/B lower (30 kg/cm2) to the proper tension value of (B/B upper) minus (B/B lower) (20 to 70 kg/cm2), that is, 50 to 100 kg/cm2.

(2) Evaluation method of solid inking properties

By using an image processing device LA555 manufactured by PIAS Co., Ltd., a standard deviation of luminance of the solid portion (3×3 mm) was measured. The smaller the standard deviation of luminance is, the better the solid inking properties. Normally, it is necessary that the solid

TABLE 1

| Sample No. | Surface printing layer | | Compressive layer | | |
|---|---|---|---|---|---|
| | Thickness* (%) | Hardness (°) | Thickness* (%) | Hardness (°) | Foam content (%) |
| Sample 1 | 5 | 60 | 20 | 60 | 45 |
| Sample 2 | 10 | 60 | 20 | 60 | 45 |
| Sample 3 | 20 | 60 | 20 | 60 | 45 |
| Sample 4 | 10 | 30 | 20 | 60 | 45 |
| Sample 5 | 10 | 40 | 20 | 60 | 45 |
| Sample 6 | 10 | 70 | 20 | 60 | 45 |
| Sample 7 | 10 | 80 | 20 | 60 | 45 |
| Sample 8 | 10 | 60 | 5 | 60 | 45 |
| Sample 9 | 10 | 60 | 15 | 60 | 45 |
| Sample 10 | 10 | 60 | 25 | 60 | 45 |
| Sample 11 | 10 | 60 | 35 | 60 | 45 |
| Sample 12 | 10 | 60 | 20 | 30 | 45 |
| Sample 13 | 10 | 60 | 20 | 40 | 45 |
| Sample 14 | 10 | 60 | 20 | 80 | 45 |
| Sample 15 | 10 | 60 | 20 | 90 | 45 |
| Sample 16 | 10 | 60 | 20 | 60 | 20 |
| Sample 17 | 10 | 60 | 20 | 60 | 30 |
| Sample 18 | 10 | 60 | 20 | 60 | 60 |
| Sample 19 | 10 | 60 | 20 | 60 | 70 |
| Comparative Example 1 | 10 | 60 | 20 | 60 | 45 |
| Comparative Example 2 | 10 | 65 | 20 | 60 | 60 |

*Thickness: It is shown in % based on the whole thickness.

B. Preparation of comparative offset blanket

According to the same manner as that described hereinabove except that a cotton fabric for forming the reinforcing layer in which an acrylonitrile-butadiene rubber latex has been impregnated was laminated on the top surface of the supporting base for forming the compressive layer to form a reinforcing layer having a thickness of 0.27 mm between the compressive layer and the surface printing layer, two kinds of offset blankets having a different foam content of the compressive layer and a different hardness of the surface printing layer (Comparative Examples 1 and 2) were obtained.

C. Evaluation test

By using each offset blanket thus obtained, paper feeding properties and solid inking properties were evaluated.

(1) Evaluation method of paper feeding properties

The paper feeding properties can be evaluated by a tension value between B/B and satelite in a rotary offset printing press for news printing. A printing tension and a feeding tension are set to 2.0 kg/cm2 and 4.0 kg/cm2, respectively. The above tension value can be determined by inking properties are equal or superior to those of the offset blanket of Comparative Example 1.

Figure 3:
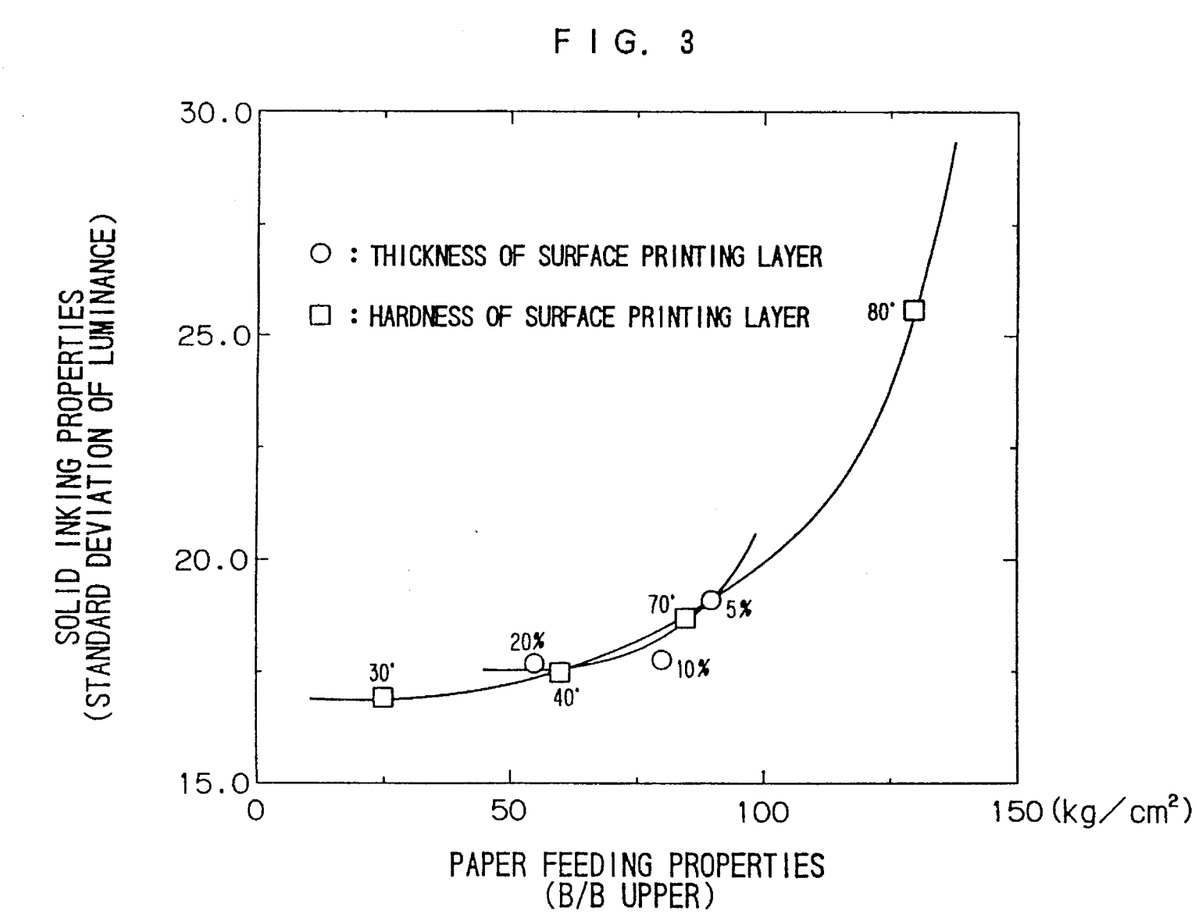
FIG. 3 is a graph illustrating the influence of each factor of the surface printing layer on paper feeding properties and solid inking properties.
Figure 4:
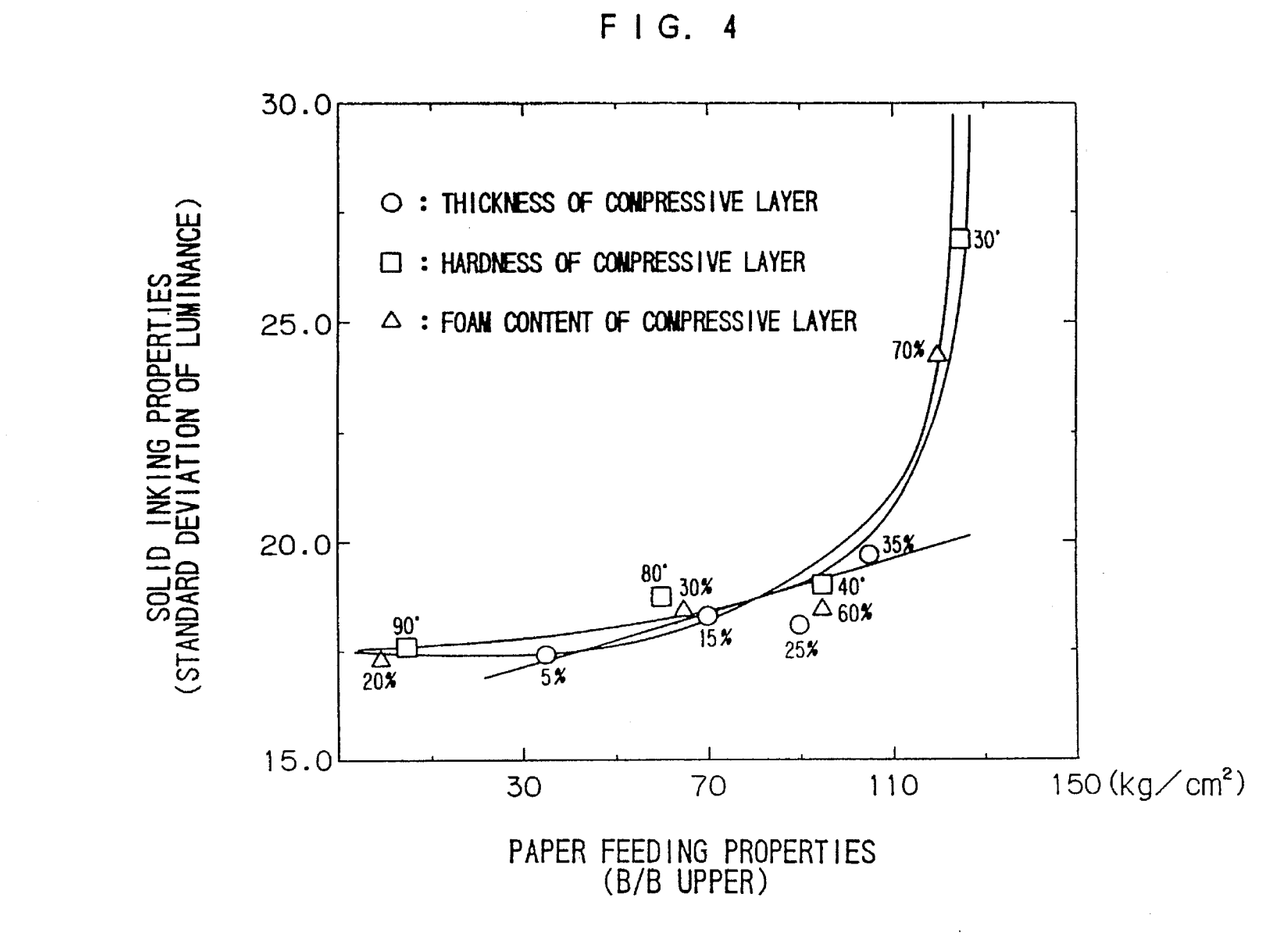
FIG. 4 is a graph illustrating the influence of each factor of the compressive layer on paper feeding properties and solid inking properties.

These evaluation results are shown in Table 2 below. According to these evaluation results, an influence of each factor of the surface printing layer on paper feeding properties and solid inking properties is shown in FIG. 3 and an influence of each factor of the compressive layer on paper feeding properties and solid inking properties is shown in FIG. 4.

TABLE 2

| Sample No. | Paper feeding properties (kg/cm2) [(B/B) upper] | Solid inking properties (Standard deviation of luminance) |
|---|---|---|
| Sample 1 | 90 | 19.1 |
| Sample 2 | 80 | 17.8 |
| Sample 3 | 55 | 17.7 |
| Sample 4 | 25 | 16.9 |
| Sample 5 | 60 | 17.5 |
| Sample 6 | 85 | 18.7 |
| Sample 7 | 130 | 25.6 |

TABLE 2-continued

| Sample No. | Paper feeding properties (kg/cm2) [(B/B) upper] | Solid inking properties (Standard deviation of luminance) |
|---|---|---|
| Sample 8 | 35 | 17.4 |
| Sample 9 | 70 | 18.3 |
| Sample 10 | 90 | 18.1 |
| Sample 11 | 105 | 19.7 |
| Sample 12 | 125 | 26.9 |
| Sample 13 | 95 | 19.0 |
| Sample 14 | 60 | 18.7 |
| Sample 15 | 5 | 17.6 |
| Sample 16 | 0 | 17.4 |
| Sample 17 | 65 | 18.5 |
| Sample 18 | 95 | 18.5 |
| Sample 19 | 120 | 24.3 |
| Comparative Example 1 | 0 | 18.9 |
| Comparative Example 2 | 60 | 30.6 |

As is apparent from Tables 1 and 2 and FIGS. 3 and 4, it is very difficult to satisfy both paper feeding properties and solid inking properties in Comparative Examples 1 and 2, simultaneously. On the other hand, in the offset blankets wherein the thickness and hardness of the surface printing layer as well as the thickness, hardness and foam content of the compressive layer are within the predetermined range, respectively, among each sample wherein the reinforcing layer has been eliminated, since the deformation of the surface printing layer at the time of printing can be directly released to the compressive layer, formation of bulge is little (therefore, increase in perimeter is little), which results in good paper feeding properties. Further, since the offset blankets have no reinforcing layer, they can follow satisfactorily to the rotation of the cylinder and a contacting time with the paper becomes long, which results in no deterioration of solid inking properties.

What is claimed is:

1. A printing offset blanket comprising:
   a supporting layer, comprising:
   a compressive layer, comprising a rubber matrix, and a supporting base layer, comprising a plurality of nonwoven fabric sub-layers, laminated onto a surface of said compressive layer, and
   a surface printing layer, comprising rubber, laminated on a surface of said compressive layer opposite to said supporting base layer;
   wherein said offset blanket has no reinforcing layer between the compressive layer and the surface printing layer;
   wherein said surface printing layer has a thickness of about 5 to 20% of the thickness of the whole blanket;
   wherein said rubber comprising the surface printing layer has a hardness of about 40° to 70° Type A hardness according to JIS K 6301;
   wherein said compressive layer has:
   a void volume of about 30 to 60%, and
   a thickness of about 10 to 30%, of the thickness of the whole blanket; and
   wherein said rubber matrix comprising the compressive layer has a hardness of about 40° to 80° Type A hardness according to JIS K 6301.

2. The printing offset blanket according to claim 1 wherein the thickness of said surface printing layer is of about 10 to 15%.

3. The printing offset blanket according to claim 1, wherein said hardness of said rubber constituting said surface printing layer is about 50° to 65°.

4. The printing offset blanket according to claim 1, wherein said hardness of said matrix rubber constituting said compressive layer is about 50° to 70°.

5. The printing offset blanket according to claim 1, wherein the void volume of said compressive layer is about 35 to 55%.

6. The printing offset blanket according to claim 1, wherein the thickness of said compressive layer is about 15 to 25% of the thickness of the whole blanket.

* * * * *